United States Patent [19]

Bell et al.

[11] Patent Number: 5,791,723
[45] Date of Patent: Aug. 11, 1998

[54] BUMPER WEDGE FOR AUTOMOTIVE VEHICLE SLIDING DOOR

[75] Inventors: Mary Teresa Bell, Monroe; James Mario Hagerman, Northville; Roger A. Shipman, West Bloomfield; Rajinder Pal Singh, Canton; Charles Lincoln Varney, Grosse Ile, all of Mich.

[73] Assignee: Ford Motor Company, Dearborn, Mich.

[21] Appl. No.: 784,887

[22] Filed: Jan. 16, 1997

[51] Int. Cl.[6] ............................ B60J 5/06; E05F 15/02
[52] U.S. Cl. .................... 296/155; 296/146.9; 16/86 B; 49/483.1
[58] Field of Search ....................... 296/155, 146.9; 16/82, 85, 86 R, 86 A, 86 B; 49/483.1

[56] References Cited

U.S. PATENT DOCUMENTS

| | | |
|---|---|---|
| 1,683,793 | 7/1928 | Nyman . |
| 1,884,827 | 10/1932 | Perry . |
| 2,596,780 | 5/1952 | Meyers et al. . |
| 3,359,030 | 12/1967 | Newman . |
| 3,819,228 | 6/1974 | Cornacchia ............... 296/146.9 |
| 4,192,039 | 3/1980 | Haberle et al. ............ 16/86 B |
| 4,603,363 | 7/1986 | Rickert et al. . |
| 4,692,960 | 9/1987 | Jozefczak . |
| 4,984,842 | 1/1991 | Ogawa et al. ............. 296/155 |
| 5,433,031 | 7/1995 | Dailey ..................... 49/483.1 X |
| 5,492,349 | 2/1996 | Mass et al. . |
| 5,626,384 | 5/1997 | Walther .................... 296/155 |

FOREIGN PATENT DOCUMENTS

| | | |
|---|---|---|
| 2 478 718 | 3/1981 | France . |
| 1224167 | 9/1966 | Germany . |
| 57-147923 | 9/1982 | Japan . |
| 2-63291 | 3/1990 | Japan . |
| 5-254461 | 10/1993 | Japan . |
| 2075117 | 4/1981 | United Kingdom . |

Primary Examiner—Joseph D. Pape
Attorney, Agent, or Firm—David B. Kelley

[57] ABSTRACT

In an automotive vehicle having a body opening closable by a sliding door, a door bumper wedge for restraining longitudinal and lateral movement of the sliding door has a wedge member attached to a door mating surface of the body opening, a receptacle member attached on a body mating edge of the sliding door defining a receptacle pocket, a pair of flexible, opposed prongs extending from the receptacle member a predetermined distance into the receptacle pocket, and a bumper member positioned within the receptacle pocket. The bumper member has a base portion, a pair of opposed arms extending from the base portion, each of the pair of arms positioned between one of the pair of prongs and a surface of the receptacle pocket, and a trough, defined by the pair of arms and the base portion, for receiving the wedge member therein when the sliding door is moved to a closed position, the wedge member restraining generally longitudinal movement of the sliding door by impacting the base portion, the pair of prongs and the pair of arms absorbing energy from the wedge member and limiting sliding door movement in a generally lateral direction when the sliding door is in the closed position by restraining relative movement between the wedge member and the receptacle member. An adjustment bracket is attached to an inner surface of the body pillar on an opposite side of the door mating surface for attaching the wedge plate to the door mating surface. The adjustment bracket adjustable to accommodate tolerance variation between the receptacle member and the wedge member upon first closure of the sliding door.

17 Claims, 4 Drawing Sheets

5,791,723

1

BUMPER WEDGE FOR AUTOMOTIVE VEHICLE SLIDING DOOR

FIELD OF THE INVENTION

The present invention relates to automotive vehicle sliding doors in general, and more specifically to a door bumper wedge apparatus for aligning and securing a vehicle sliding door.

BACKGROUND OF THE INVENTION

Automotive vehicles, particularly van type vehicles, commonly have a sliding door for alternately covering and uncovering an entrance opening. The entrance opening is typically on a side of the vehicle and the sliding door slides in a rearward direction on a set of tracks to a position slightly outward of an outer body surface of the vehicle to uncover the entrance opening. The sliding door is moved in a forward direction and latches to a B-pillar in a closed position to cover the entrance opening.

In order to achieve a better fit between the B-pillar and the sliding door when in the closed position, it is known to furnish a wedge for insertion into a slot at the sliding door interface with the B-pillar. Such wedge and slot combinations can also assist in shock absorption when the sliding is closed, as disclosed in Japanese Patent 57-147923. The device shown there has a male projection 12 carried by a metallic base 13 attached to the vehicle body 2, and a female member 9 carried by the door 3. The male projection 12 relies on a lip part 14b to provide shock-absorbing capacity. Such a design, however, has the drawback that the lip part, which as described in the patent is a soft rubber material, initially contacts the female member 9 and is subject to wear.

Another wedge assembly is known which has prongs on an inner surface of a wedge receiver with softer portions between the inner surface and the prongs. The assembly does not provide, however, a bumper which stops fore-aft travel of the wedge when the sliding door is moved to the closed position. In addition, there is no provision for adjusting the wedge after installation on the body pillar so as to provide accurate alignment of the wedge and wedge receiver.

An additional problem with known sliding door wedge assemblies is improper alignment of the wedge with the wedge receiver. Such misalignment stems in part from tolerance build-up and can result in degraded vehicle NVH performance, particularly increased squeak-and-rattle of the sliding door.

A door bumper wedge assembly is thus needed which has a wedge member accurately aligned with a wedge receiver and which limits both longitudinal and lateral movement of a vehicle sliding door.

SUMMARY OF THE INVENTION

The deficiencies of the related art are overcome in the present invention by providing a door bumper wedge having a wedge member attached to a door mating surface, a receptacle member attached on a body mating edge of the sliding door and defining a receptacle pocket, a pair of flexible, opposed prongs extending from the receptacle member a predetermined distance into the receptacle pocket, and a bumper member positioned within the receptacle pocket. The bumper member has a base portion, a pair of opposed arms extending from the base portion, each of the pair of arms positioned between one of the pair of prongs and a surface of the receptacle pocket, and a trough, defined

2 by the pair of arms and the base portion, for receiving the wedge member therein when the sliding door is moved to a closed position, the wedge member restraining generally longitudinal movement of the sliding door by impacting the base portion, the pair of prongs and the pair of arms absorbing energy from the wedge member and limiting sliding door movement in a generally lateral direction when the sliding door is in the closed position by restraining relative movement between the wedge member and the receptacle member.

A wedge adjustment means, preferably in the form of an adjustment bracket having deformable members thereon, is attached to an inner surface of the body pillar on an opposite side of the door mating surface to accommodate tolerance variation between the receptacle member and the wedge member upon first closure of the sliding door.

An advantage of the present invention is a door bumper wedge which limits both longitudinal and lateral movement of a vehicle sliding door.

Another advantage is a door bumper wedge having a receptacle which absorbs energy from the sliding door.

Still another advantage of the present invention is a door bumper wedge assembly which provides accurate alignment between the wedge member and a receptacle member on the sliding door.

A feature is a door bumper wedge with a bumper contained within a receptacle member to prevent excess exposure for preserving the resilient characteristics thereof.

Yet another feature is an adjustment bracket having deformable members thereon which deform when a wedge base plate is adjusted to properly align the wedge member with the receptacle member.

BRIEF DESCRIPTION OF THE DRAWINGS

These and other objects, advantages, and features of the present invention will be apparent to those skilled in the art upon reading the following description with reference to the accompanying drawings, in which.

DETAILED DESCRIPTION OF THE PREFERRED EMBODIMENT

Figure 1:
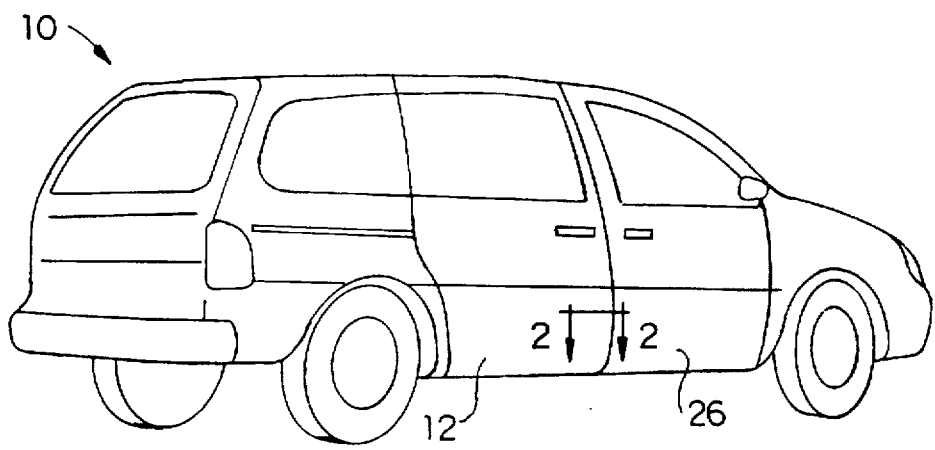
FIG. 1 is a perspective view of an automotive vehicle having a sliding door for covering an access opening having a door bumper apparatus according to an embodiment of the present invention.
Figure 2:
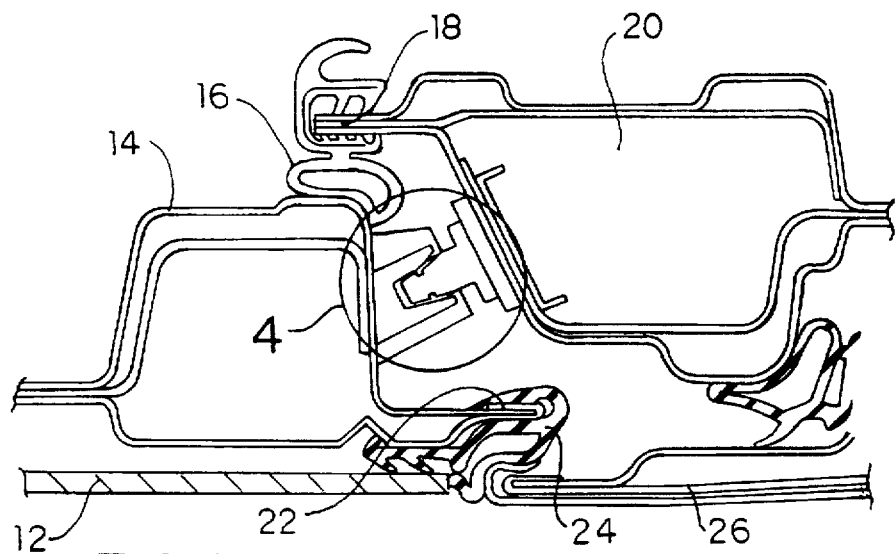
FIG. 2 is a cross-sectional view taken along line 2—2 of FIG. 1 showing a sliding door in a closed position and a door bumper apparatus according to the present invention with a receptacle member in an mating position encasing a wedge member.

Turning now to the drawings, and in particular to FIG. 1 thereof, and automotive vehicle 10 is shown having a sliding door 12 on a side thereof, which is typical in van type vehicles. As seen in FIG. 2, the door 12 has an inner surface 14 which abuts a seal 16 extending along an edge 18 of a structural body pillar 20. The body pillar 10 may be, for example, the B-pillar, which as known in the art, typically provides a mating surface for a vehicle sliding door. The door 12 has a seal flange 22 on which is mounted a door seal 24 which provides a seal between the door 12 and an adjacent door 26, which may be, for example, a front passenger side hinged door.

As is known in the art, the sliding door 12 covers a body opening 28 (FIG. 3), to provide access to and from the vehicle 10 interior. The sliding door has a closed position covering the body opening 28 (FIGS. 1 and 2), and an open position (FIG. 3) uncovering the body opening 28.

Figure 3:
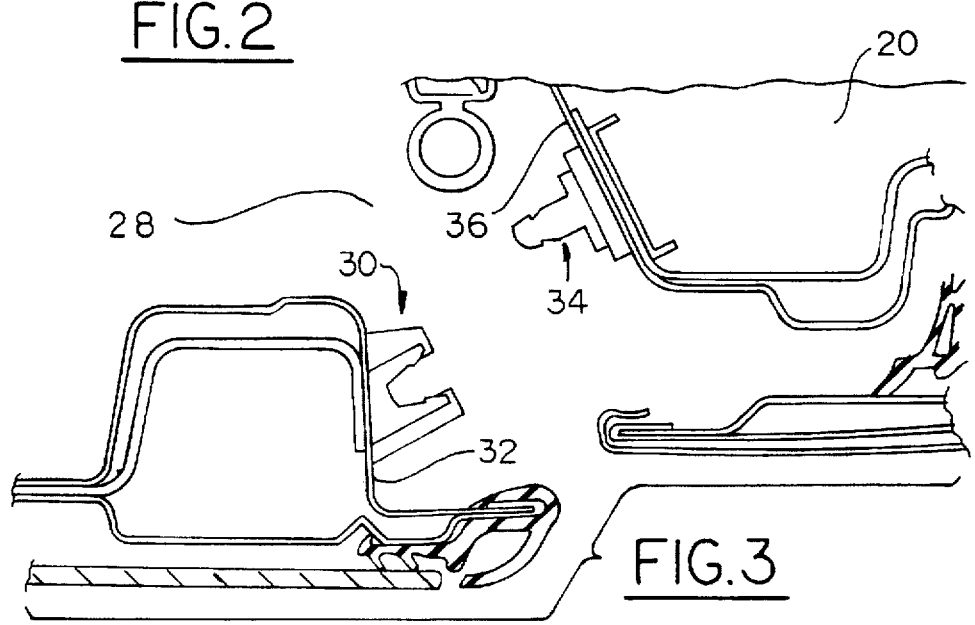
FIG. 3 is a cross-sectional view similar to FIG. 2 but showing the sliding door in an open position with the receptacle member in a withdrawn position from the wedge member.

Turning now to FIG. 3, the door 12 has a receptacle member 30 attached on a body mating edge 32 thereof, and a wedge member 34 attached to a door mating surface 36 of the body pillar 20.

Figure 4:
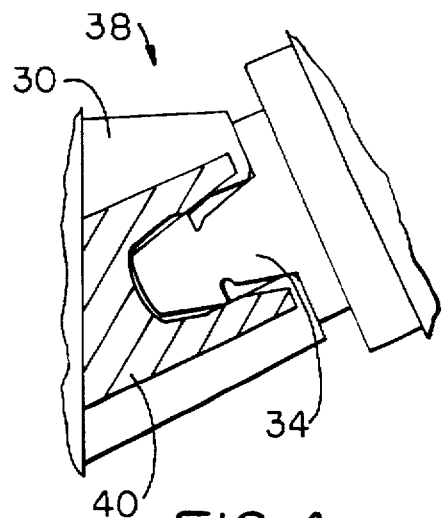
FIG. 4 is an enlarged sectional view from line 4 of FIG. 2 showing the bumper wedge apparatus of the present invention in the mating position.
Figure 5:
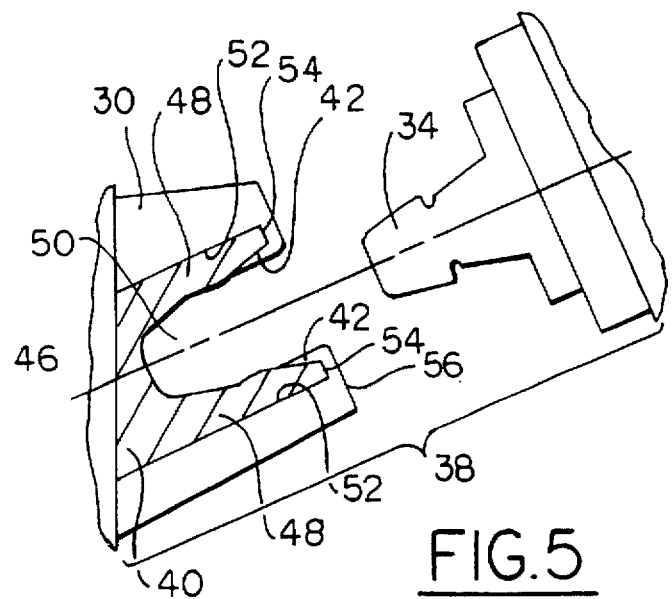
FIG. 5 is an enlarged sectional view showing the bumper wedge apparatus in the withdrawn position.
Figure 6:
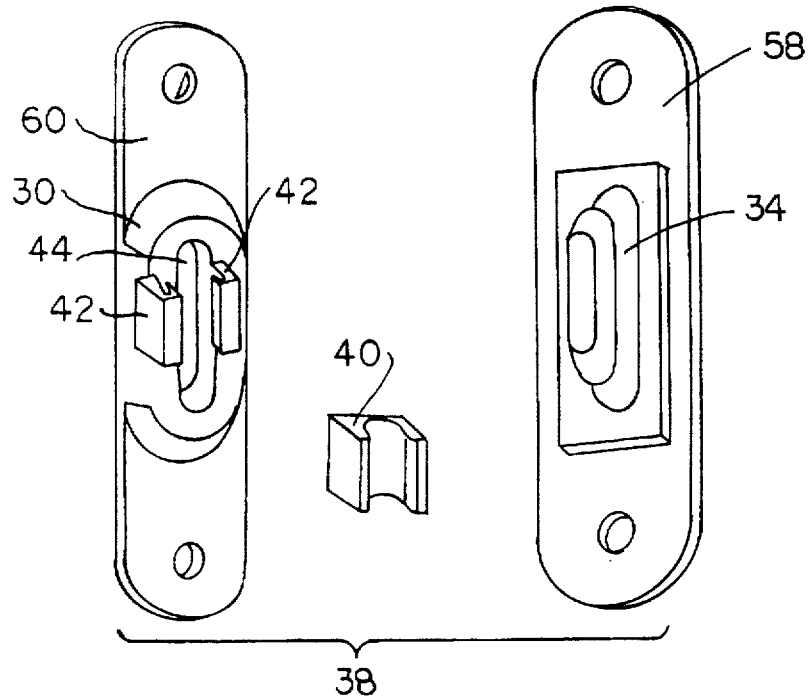
FIG. 6 is an exploded, perspective view of a door bumper apparatus according to the present invention.
Figure 7:
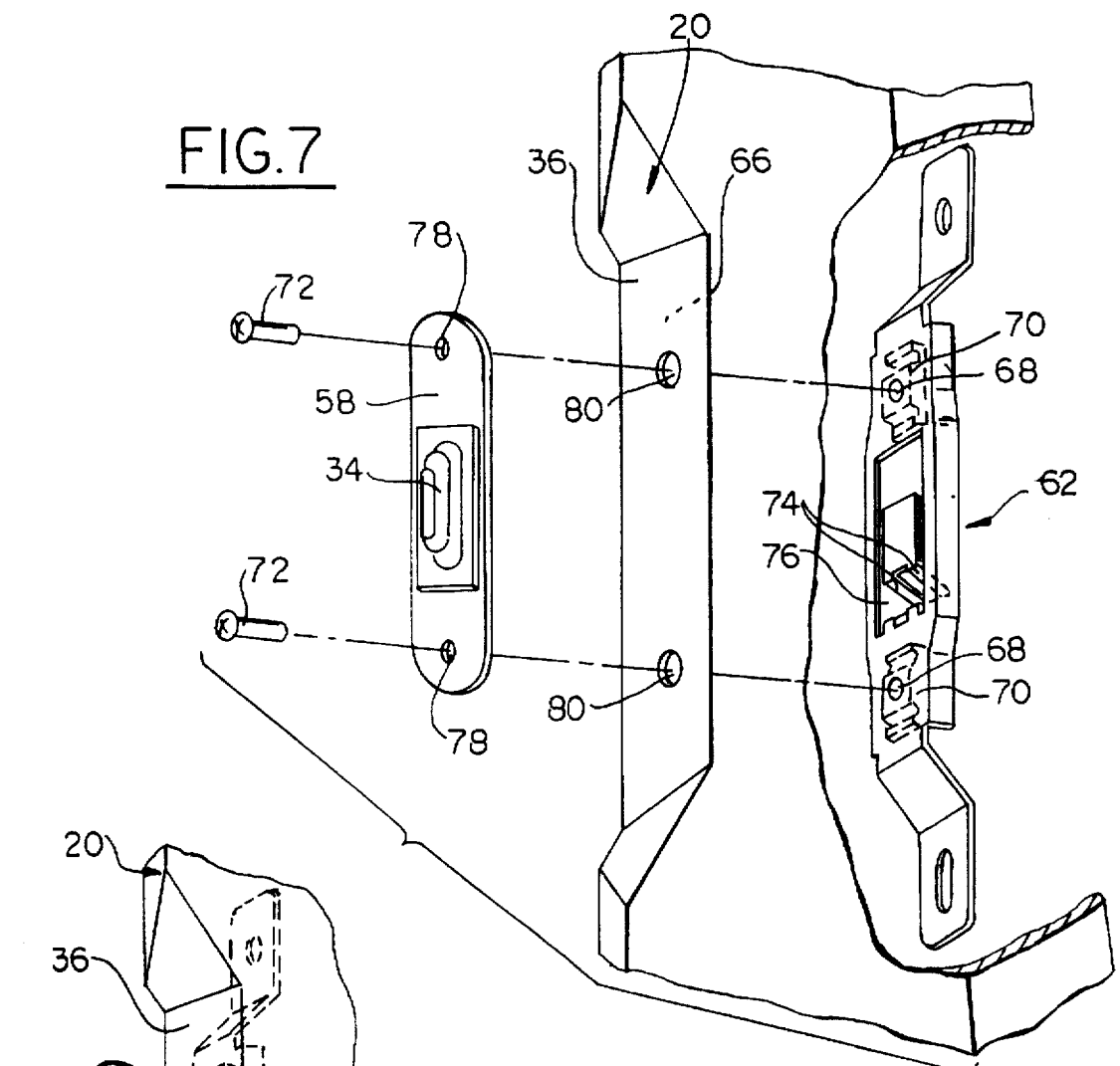
FIG. 7 is an exploded, perspective view of the attachment of the wedge plate to the body pillar.
Figure 8:
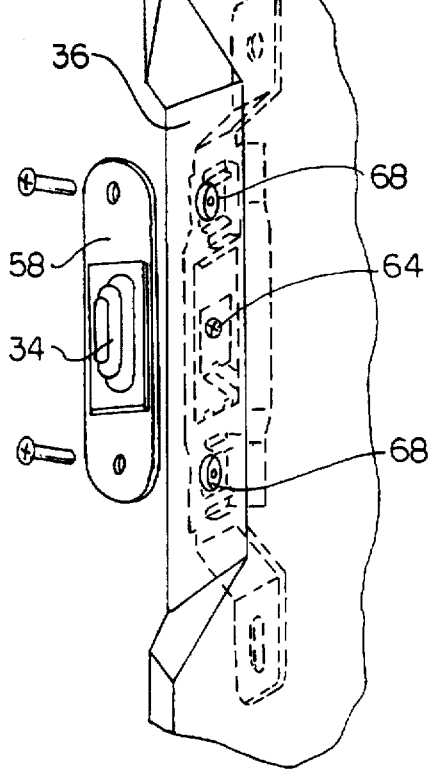
FIG. 8 is a perspective view showing an adjustment bracket attached to the body pillar.
Figure 9:
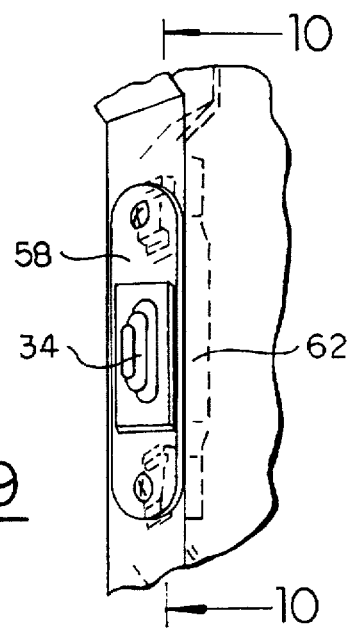
FIG. 9 is a perspective view showing the wedge plate assembled to the body pillar and the adjustment bracket.
Figure 10:
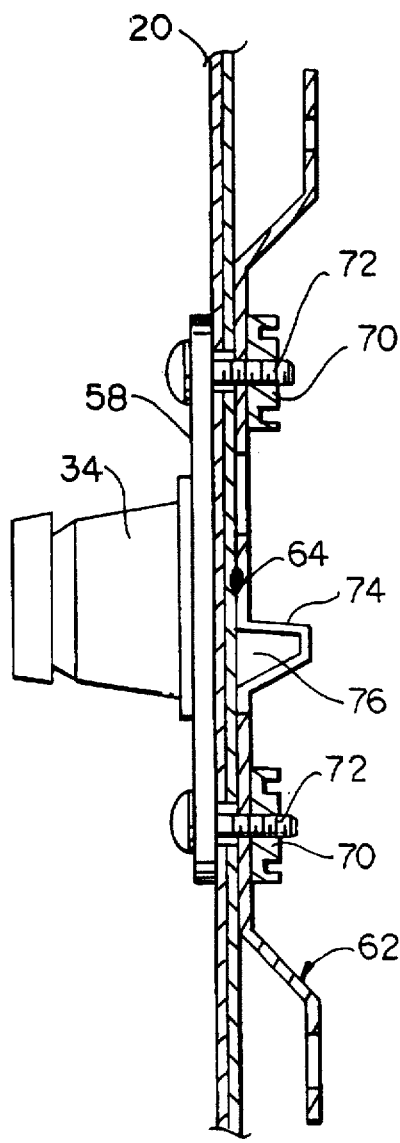
FIG. 10 is a side cross-sectional view taken along line 10—10 of FIG. 9 showing bridge members of the adjustment bracket in an undeformed state prior to closing of the vehicle door for a first time.
Figure 11:
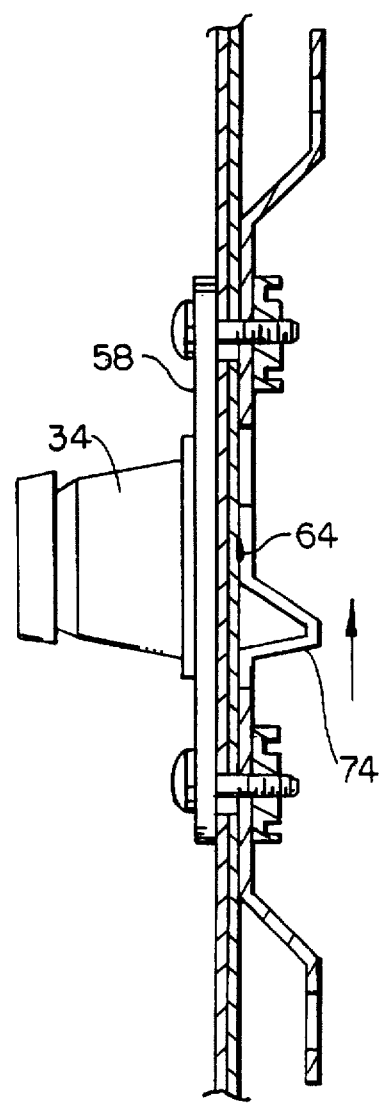
FIG. 11 is a cross-sectional view similar to FIG. 10 but showing the bridge members in a deformed state after the vehicle has been closed for a first time to allow adjustment of the wedge plate relative to the body pillar prior to securing the bolts between the wedge plate and the adjustment bracket.
Figure 12:
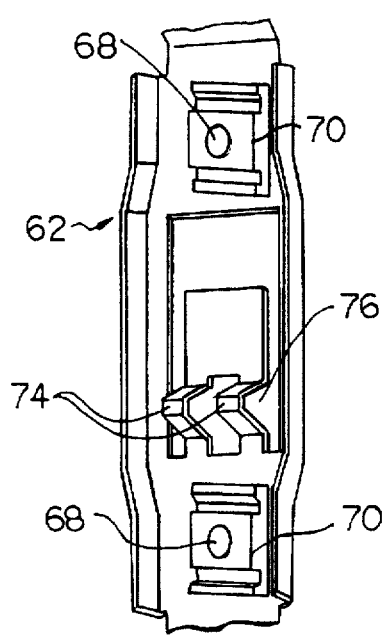
FIG. 12 is a top view of an adjustment bracket for use with the door bumper wedge assembly of the present invention.

In FIGS. 4-6, a door bumper wedge 38 according to a preferred embodiment of the present invention is shown. The door bumper wedge 38 includes the wedge member 34 and the receptacle member 30, in addition to a bumper member 40 (FIG. 4). As best seen in FIG. 5, the receptacle member 30 has a pair of flexible, opposed prongs 42 extending therefrom a predetermined distance into a receptacle pocket 44 (FIG. 6). Disposed within the receptacle pocket 44 is the bumper member 40 (FIGS. 4 and 5). The bumper member 40 has a base portion 46, a pair of opposed arms 48 extending from the base portion 46 (FIG. 5), and a trough 50 defined by the pair of arms 48 and the base portion 46. Each of the pair of arms 48 is positioned between one of the pair of prongs 42 and an inner surface 52 of the receptacle pocket 44. Each of the pair of prongs 42 has an extension portion 54 attached to an upper edge 56 of the receptacle member 30 so as to extend the pair of prongs 40 to a predetermined distance into the receptacle pocket 44.

The trough 50 receives the wedge member 34 therein (FIG. 4). When the sliding door is moved to the closed position, the wedge member restrains generally longitudinal movement of the sliding door by impacting the base portion 46. When the sliding door 12 is in the closed position, the pair of prongs 42 and a pair of arms 48 absorb energy from the wedge member 34, which may be vibration induced energy, so as to limit the sliding door movement in a lateral direction when the sliding door is in the closed position. Relative movement between the wedge member 34 and the receptacle member 30 is also limited by the prongs 42 and the arms 48.

Preferably, the wedge member 34 is an integral piece with a wedge base plate 58 (FIG. 6), which as described below, attaches to the door mating surface 36 of the body pillar 20. Similarly, the receptacle member 30 has a receptacle base plate 60 integral therewith which attaches to the body mating edge 32 of the sliding door 12. Preferably, the receptacle member, the receptacle base plate 60, and the pair of prongs 42 are an integral piece (FIG. 6). The wedge member 34 is preferably made of a durable material, such as nylon, the receptacle member is preferably made of an acetyl material, and the bumper member is preferably made of a santoprene rubber material.

Attachment of the wedge base plate 58 to the door mating surface of the body pillar 20 will be described with reference to FIG. 7-12. It is important to recognize that tolerance build-up during construction of the vehicle 10 requires adjustability between the receptacle member 30 on the sliding door 12 and the wedge member 34 on the body pillar 20. An important feature of the present invention is an adjustable attachment bracket 62 (FIG. 7) which allows the wedge base plate 58 to be adjusted relative to the body pillar 20 when the sliding door 12 is closed for a first time. The adjustment bracket 62 is attached, for example, by welding at a single weld spot 64 to an inner surface 66 of the body pillar 20 on an opposite side of the door mating surface 36. The adjustment bracket 62 has a pair of bracket attachment holes 68, each of the holes 68 having a pierce nut 70 fixed proximate thereto with a first predetermined diameter for receiving a bolt 72 therethrough in snug fig relationship.

Between the bracket attachment holes 68 are a pair of bridge members 74 (FIGS. 7, and 10–12) spanning a gap 76 in the bracket 62 and displaced from a plane of the bracket 62 away from the inner surface 66. The wedge base plate 58 has a pair of base plate holes with a diameter equal to the first predetermined diameter of the pierce nuts 70. The body pillar 20 has a pair of pillar holes 80 therethrough which have a second predetermined diameter greater than that of the first predetermined diameter. The bolts 72 attach to the wedge base plate hole 78 through the pillar holes 80 and into the pierce nuts 70 (FIGS. 7 and 10) and are loosely tightened prior to a first closure of the sliding door 12.

When the sliding door 12 is first closed, the receptacle member 30 encases the wedge member 34 and build tolerance may result in the wedge member 34 not fitting well into the receptacle member 30. If not corrected, a poor fit may result in degraded NVH characteristics, including increased squeaks and rattle of the sliding door. To remedy this potentiality, the door bumper wedge assembly of the present invention has a wedge base plate 58 which can adjust position upon first closure of the sliding door thereagainst. Since the wedge base plate is initially loosely attached to the adjustment bracket 62, first closure of the sliding door 12 thereagainst aligns the wedge member 34 properly within the receptacle member 30, thereby preventing stresses and strains resulting from inaccurate alignment and decreasing undesirable NVH characteristics.

Upon first closure of the sliding door 12 against the body pillar 20, the wedge base plate 58 may change position relative to the body pillar 20 to accommodate tolerance build-up, as described above. This change of position may cause tension or compression in the adjustment bracket 62 which is fixedly attached to the body pillar 20. Without a means for relieving the tension or compression, the wedge base plate 58 could not move relative to the body pillar 20, or would potentially be under stress or strain if initially bolted securely to the body pillar 20. The bridge members 74 can deform (FIG. 11) to relieve the compression or tension due to realignment of the wedge base plate 58 after first closure of the sliding door 12. The sliding door 12 can then be reopened and the bolts 72 securely fixed so that the wedge member 34 is properly aligned with the receptacle member 30.

The pillar holes 80 must have a larger diameter than the wedge base plate 78 and the bracket holes 68 to allow the wedge base plate 58 to move relative to the body pillar 20 upon first closure of the sliding door 12. When the bolts 72 are secured thereafter, the wedge base plate 58 is fixed relative to the body pillar 20.

The adjustment bracket 62 has a pair of locating holes 82 at opposite ends to facilitate welding to the inner surface 66 of the body pillar 20.

Although the preferred embodiment of the present invention has been disclosed, various changes and modifications may be made without departing from the scope of the invention as set forth in the appended claims.

We claim:

1. A door bumper wedge assembly for an automotive vehicle having a body opening closable by a sliding door, the assembly comprising:

a wedge member attached to a door mating surface of the body pillar;

a receptacle member, attached on a body mating edge of the sliding door, defining a receptacle pocket;

a pair of flexible, opposed prongs extending from the receptacle member a predetermined distance into the receptacle pocket; and a bumper member positioned within the receptacle pocket, the bumper member having:
   a base portion;
   a pair of opposed arms extending from the base portion, each of the pair of arms positioned between one of the pair of prongs and a surface of the receptacle pocket; and
   a trough, defined by the pair of arms and the base portion, for receiving the wedge member therein when the sliding door is moved to a closed position, the wedge member restraining generally longitudinal movement of the sliding door by impacting the base portion, the pair of prongs and the pair of arms absorbing energy from the wedge member and limiting sliding door movement in a generally lateral direction when the sliding door is in the closed position by restraining relative movement between the wedge member and the receptacle member.

2. A door bumper wedge assembly according to claim 1 wherein the wedge member is an integral piece with a wedge base plate which attaches to the door mating surface of the body opening.

3. A door bumper wedge assembly according to claim 1 wherein the receptacle member has a receptacle base plate integral therewith which attaches to the body mating edge of the sliding door.

4. A door bumper wedge assembly according to claim 3 wherein the receptacle member, the receptacle base plate, and the pair of prongs are an integral piece.

5. A door bumper wedge assembly according to claim 1 wherein each of the pair of prongs has an extension portion attached to an upper edge of the receptacle member so as to extend the pair of prongs the predetermined distance into the receptacle pocket.

6. A door bumper wedge assembly according to claim 5 wherein the receptacle member, the receptacle base plate, the pair of prongs, and the extension portions are an integral piece.

7. A door bumper wedge assembly according to claim 1 wherein the wedge member is made of a nylon material.

8. A door bumper wedge assembly according to claim 1 wherein the receptacle member is made of an acetyl material.

9. A door bumper wedge assembly according to claim 1 wherein the bumper member is made of a santoprene rubber material.

10. A door bumper wedge assembly for an automotive vehicle having a body opening closable by a sliding door, the bumper wedge comprising:

(a) a wedge member extending from a wedge base plate attached to a door mating surface of the body pillar;

(b) a receptacle member, extending from a receptacle base plate attached on a body mating edge of the sliding door, defining a receptacle pocket;

(c) a pair of flexible, opposed prongs extending from the receptacle member a predetermined distance into the receptacle pocket; and (d) a bumper member positioned within the receptacle pocket, the bumper member having:
   (i) a base portion;
   (ii) a pair of opposed arms extending from the base portion, each of the pair of arms positioned between one of the pair of prongs and a surface of the receptacle pocket;
   (iii) a trough, defined by the pair of arms and the base portion, for receiving the wedge member therein when the sliding door is moved to a closed position, the wedge member restraining generally longitudinal movement of the sliding door by impacting the base portion, the pair of prongs and the pair of arms absorbing energy from the wedge member and limiting sliding door movement in a generally lateral direction when the sliding door is in the closed position by restraining relative movement between the wedge member and the receptacle member; and (e) wedge adjustment means attached to an inner surface of the body pillar on an opposite side of the door mating surface for attaching the wedge plate to the door mating surface, the wedge adjustment means adjustable to accommodate tolerance variation between the sliding door and the body pillar when the wedge plate is attached to the door mating surface and the sliding door is moved to the closed position for a first time.

11. A door bumper wedge assembly according to claim 10 wherein the wedge adjustment means a bracket attached to the inner surface with a pair of bolt receiving attachment holes therethrough and at least one deformation member between the pair of holes.

12. A door bumper wedge assembly according to claim 11 wherein the deformation member comprises a bridge member spanning a gap in the bracket and displaced from a plane of the bracket away from the inner surface.

13. A door bumper wedge assembly according to claim 11 wherein each of the pair of holes has a pierce nut therein for receiving a bolt therethrough in snug-fit relationship.

14. A door bumper wedge assembly according to claim 10 wherein the receptacle member, the receptacle base plate, and the pair of prongs are an integral piece.

15. A door bumper wedge assembly according to claim 10 wherein each of the pair of prongs has an extension portion attached to an upper edge of the receptacle member so as to extend the pair of prongs the predetermined distance into the receptacle pocket.

16. A door bumper wedge assembly according to claim 15 wherein the receptacle member, the receptacle base plate, the pair of prongs, and the extension portions are an integral piece.

17. A door bumper wedge assembly for an automotive vehicle having a body opening closable by a sliding door, the bumper wedge comprising:

(a) a wedge member extending from a wedge base plate attached to a door mating surface of the body pillar, the wedge base plate having a pair of plate attachment holes therethrough with a first predetermined diameter;

(b) a receptacle member, extending from a receptacle base plate attached on a body mating edge of the sliding door, defining a receptacle pocket;

(c) a pair of flexible, opposed prongs extending from the receptacle member a predetermined distance into the receptacle pocket; and (d) a bumper member positioned within the receptacle pocket, the bumper member having:
  (i) a base portion;
  (ii) a pair of opposed arms extending from the base portion, each of the pair of arms positioned between one of the pair of prongs and a surface of the receptacle pocket;
  (iii) a trough, defined by the pair of arms and the base portion, for receiving the wedge member therein when the sliding door is moved to a closed position, the wedge member restraining generally longitudinal movement of the sliding door by impacting the base portion, the pair of prongs and the pair of arms absorbing energy from the wedge member and limiting sliding door movement in a generally lateral direction when the sliding door is in the closed position by restraining relative movement between the wedge member and the receptacle member; and (e) an adjustment bracket attached to the inner surface of the body pillar on an opposite side of the door mating surface for attaching the wedge plate to the door mating surface, the adjustment bracket having:
  (i) a pair of bracket attachment holes with a pierce nut of the first predetermined diameter in each of the bracket attachment holes for receiving a bolt therethrough in snug-fit relationship;
  (ii) at least one bridge member spanning a gap in the bracket and displaced from a plane of the bracket away from the inner surface, the at least one bridge member deforming to accommodate tolerance variation between the sliding door and the body pillar; and
  (iii) a pair of locating holes on opposite ends of the bracket; and (f) a pair of pillar holes through the body pillar having a second predetermined diameter greater than that of the first predetermined diameter so that bolts attached through the wedge base plate and the adjustment bracket may adjust in orientation when the at least one bridge member deforms when the wedge plate is attached to the door mating surface and the sliding door is moved to the closed position for a first time.

* * * * *